July 31, 1923.

H. W. NICHOLS

SIGNALING

Filed Dec. 4, 1918

1,463,433

Inventor:
Harold W. Nichols
by J. K. Roberts Att'y.

Patented July 31, 1923.

1,463,433

UNITED STATES PATENT OFFICE.

HAROLD W. NICHOLS, OF MAPLEWOOD, NEW JERSEY, ASSIGNOR TO WESTERN ELECTRIC COMPANY, INCORPORATED, OF NEW YORK, N. Y., A CORPORATION OF NEW YORK.

SIGNALING.

Application filed December 4, 1918. Serial No. 265,255.

*To all whom it may concern:*

Be it known that I, HAROLD W. NICHOLS, a citizen of the United States, residing at Maplewood, in the county of Essex, State of New Jersey, have invented certain new and useful Improvements in Signaling, of which the following is a full, clear, concise, and exact description.

This invention relates to signaling systems and methods of signaling by the use of modulated high-frequency waves, and is more particularly adapted for use in connection with systems wherein electron-discharge or equivalent devices are used. A general object of the invention is to provide means for the utilization of alternating current supply as a source of power for such systems.

Another object of the invention is to provide means whereby a thermionic or other electron-discharge device may be controlled in accordance with a variable voltage direct current derived from an alternating voltage source.

A further object of the invention is to provide a system in which combined rectifying and amplitude varying means may be associated with a source of alternating current.

A further object is to provide means wherein an alternating voltage source may be conveniently used as a source of current for operating vacuum tubes with a minimum complexity of apparatus and a high degree of efficiency in transmitting signals.

A further object is to provide means whereby a thermionic or other electron-discharge device which functions as an oscillation generator may be controlled by a variable space current derived from an alternating source.

A further object is to provide a system wherein are associated a high-frequency generator, a source of alternating current, a rectifier for the alternating current, means for supplying the rectified current to the generator, and means for controlling the high-frequency waves generated by controlling the action of the rectifying means.

Consideration of the following description will suggest to those skilled in the art other objects and advantages of the invention.

Certain complete systems embodying the invention are described hereinafter. However, the invention is not limited to a particular embodiment but may be embodied in other constructions. Certain parts of the described apparatus may be utilized in other systems. The novel features which are considered to reside in this invention consist of certain combinations and arrangements of parts, and methods which are defined in the claims.

Figure 1:
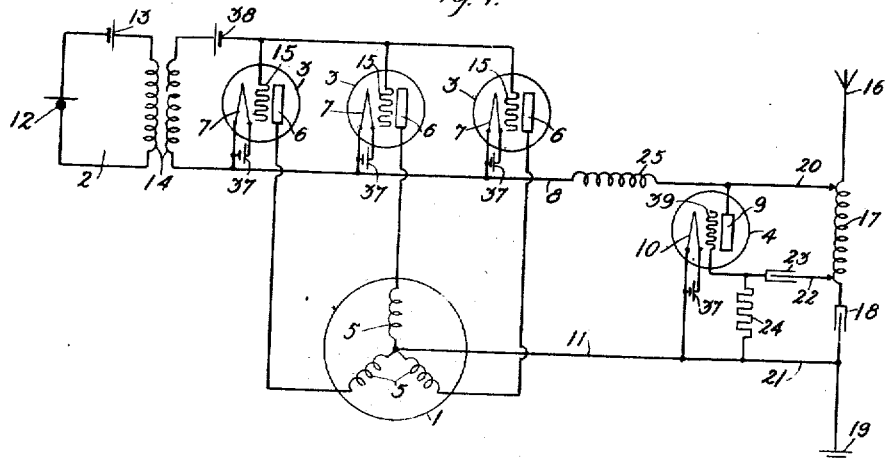
Figure 2:
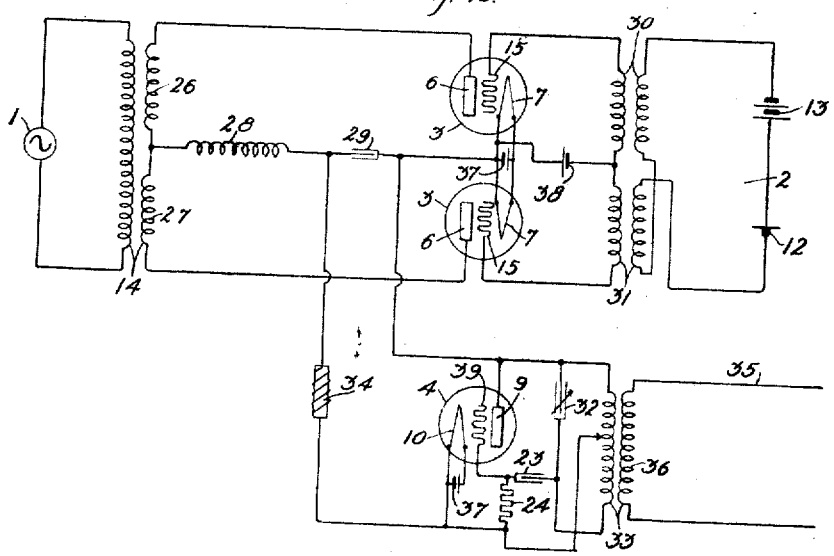

In the drawings, Fig. 1 represents one circuit arrangement embodying the invention, and Fig. 2 a modified form thereof.

In the drawings there are shown complete transmission systems for high-frequency signaling by modulated waves in accordance with the invention which include four principal groups of means, namely—

1. A source 1 of preferably polyphase alternating current;
2. A source of signaling frequency waves comprising the microphone circuit 2 and associated apparatus;
3. Rectifying means comprising electron discharge or equivalent devices 3;
4. A high-frequency source herein illustrated as the oscillation generating device 4.

Each phase 5 of the three-phase source, which may be a star-connected alternator or a suitable system of transformers, is connected in the anode-cathode circuit of one of the electron-discharge devices 3. In the arrangement shown, the anodes 6 are connected respectively to the outer terminals of the phases 5 and the cathodes 7 are connected to the opposite terminals of the phases through a circuit comprising conductor 8, anode 9, cathode 10 and conductor 11. Since the devices 3 are unsymmetrically and practically unidirectionally conducting, only the positive portion of the waves supplied from source 1 will pass therethrough from the anodes to the cathodes, and these portions will produce in conductor 8 a substantially uniform direct current having comparatively small ripples superimposed there-upon. The magnitude of these ripples will be smaller as use is made of a source 1 having a greater number of phases. Thus, for example, a 6 or 12-phase generator might be used. The microphone circuit 2 includes the microphone 12 and source of current 13. Sound waves acting upon the microphone produce current variations which are impressed by the transformer 14 upon the grids 15 which constitute impedance-varying elements for the space current paths of the devices 3, thereby varying the potential of the grids with respect to the cathodes 7. The space impedance of the devices 3 will vary in accordance with the potentials upon the grids 15; hence the normal direct voltage across device 4 will vary inversely as the voltage across devices 3. The device 4 with its associated circuits functions as a high-frequency generator and has associated therewith a tuned antenna circuit which includes aerial 16, coil 17, condenser 18 and ground connection 19. The anode 9, cathode 10 and grid 39 of device 4 are respectively connected to the antenna circuit by conductors 20, 21, 22. In conductor 22 is located a stopping condenser 23. A resistive grid leak path 24 connects the cathode and the grid. Choke coil 25 prevents material shunting of high-frequency current through the path comprising conductor 8, devices 3 and conductor 11. Coil 25, however, offers small impedance to signaling variations. The usual filament-heating sources 37 and polarizing batteries 38 are provided.

In the operation of the system described the oscillation generating system, which includes the device 4, produces high-frequency oscillations in the antenna circuit. The amplitude of these oscillations is varied in accordance with the variations of voltage impressed upon the anode-cathode circuit of the device 4. This voltage varies according to the variations of the impedance of the devices 3, which in turn varies in accordance with the audible or other frequency waves impressed upon the microphone 12. The aerial 16 will therefore radiate into space high-frequency waves modulated in accordance with signals.

The system illustrated in Fig. 2 utilizes two sources of alternating current which are preferably in phase opposition, instead of a greater number of phases as in Fig. 1. The alternating source 1 is coupled to the coils 26 and 27 which constitute the secondary windings of a transformer 14. Devices 3 are placed in circuit with the coils 26 and 27 respectively, so that they will transmit alternate half waves and thereby cause a unidirectional current between the anode 9 and cathode 10 of device 4. Inductance 28 and capacity 29 will tend to smooth out the pulsations in this current. The potentials of grids 15 will be raised and lowered simultaneously by speech frequency variations of current in circuit 2 which contains microphone 12 and source 13. Transformers 30 and 31 serve to couple grid circuits with the microphone circuit. The windings are so arranged that the grid potentials will vary synchronously. Device 4 functions as an oscillation generator and produces high-frequency oscillations in the tuned oscillation circuit, which includes capacity 32 and coil 33. A choke coil 34 serves to prevent high-frequency currents being shunted through condenser 29, but does not materially impede signaling frequencies. The high-frequency oscillations may be transferred to a suitable line or signaling conductor 35 through a coil 36 coupled to coil 33. When sound waves act upon the transmitter 12, correspondingly modulated high frequency waves will be produced in the line 35. The condenser 23 and resistive leak path 24 function in a known manner.

The oscillations produced by the systems herein described will in general be modulated in accordance with fluctuations in the direct current supply derived from source 1. By properly choosing the frequency of source 1, however, the interference from this cause will be unobjectionable. For example, it has been found that an ordinary 60-cycle, 3-phase source 1 may be used for telephony. By the method of this invention, signaling waves of small power, such as are produced by a microphone, or might be received over a telephone line, may be utilized to variably control the rectification of several phases of alternating current of high power and thereby produce signaling variations in the resultant rectified current.

While described in connection with systems adapted for telephony, this invention is not limited to telephony, and the systems described may be easily adapted for telegraphy or selective actuation of devices at a distance by substituting a suitable low-frequency source for the microphone circuit 2.

Certain subject-matter shown and described herein is claimed in my application, Serial No. 184,060, filed August 2, 1917.

What is claimed is:

1. In combination, means for generating oscillations whose amplitude is controlled by variations of current supplied to the said means, a source of alternating current, rectifying means therefor, means for supplying rectified current from said source to said means for generating oscillations whose frequency is higher than that of the alternating current, and means for varying in accordance with signals the amplitude of the rectified current flowing through the rectifying means.

2. In combination, an electron-discharge device having an input circuit and an anode-cathode circuit, means for supplying high-frequency oscillations to the input circuit of said device, means for supplying space current to the anode-cathode circuit of said device, said means including rectifying devices, and means acting through said rectifying devices for varying in accordance with signals the current supplied to the said anode-cathode circuit.

3. A system comprising a plural phase source of alternating current, separate rectifiers for each phase, a common source of signaling variations to control the impedance of the several rectifiers, and means for combining the rectified current of the several phases and controlling thereby the generation of waves whose frequency is independent of the frequency of the alternating current and whose amplitude varies in accordance with the signaling variations.

4. In a signaling system, an electron discharge device, an anode and a cathode therefor, said anode and said cathode constituting the terminals of a space therebetween, a source of alternating electromotive force, and means including a signal controlled space discharge device to cause said source to impress upon the terminals of said space a unidirectional voltage which varies in accordance with signals, said space discharge device having its discharge path in circuit with said space.

5. The method which comprises separately rectifying each of several phases of alternating current, controlling from a common source of signaling variations the impedance of the separate rectifiers, combining the resultant rectified current of the several phases, and translating the combined current into higher frequency waves varying in accordance with the signaling variations, said waves having a frequency which is independent of the frequency of the alternating current.

6. In a signaling system, an oscillation generator including an electron discharge device, a source of polyphase electromotive force, and means to variably rectify the voltage from said source in accordance with signals to produce a varying unidirectional voltage which is impressed upon said device.

7. In a signaling system, a high-frequency generator, a characteristic of whose generated oscillations may be controlled by variation of a voltage impressed upon said generator, a source of alternating electromotive force, and means to variably rectify the voltage from said source in accordance with signals to produce a varying unidirectional voltage which is impressed upon said generator.

8. A system comprising a circuit, an electron discharge device, an anode, a cathode and an impedance-varying element for said device, connections from said device to said circuit whereby oscillations are generated in said circuit, a multiphase source of alternating current, a series of electron-discharge devices each having an anode, a cathode and an impedance-varying element, a common connection joining the cathodes of said series of devices to the anode of said first mentioned device, the anodes of said series of devices being connected respectively to corresponding terminals of the phases of said source and a common connection from the opposite terminals of said phases to the cathode of said first mentioned discharge device, a high-frequency choke coil in one of said common connections, and common means for changing the potential of the impedance-varying elements of said series of devices in accordance with signals.

9. In combination, a plurality of sources of out-of-phase alternating current, a plurality of electron discharge devices for producing a unidirectional current from the combined currents of said sources, a telephone transmitter for variably controlling said devices to cause said unidirectional current to vary in accordance with sound waves acting upon said transmitter, and means controlled by said unidirectional current for variably generating oscillations and including means for determining the frequency of the generated oscillations.

10. In a signaling system, a modulating device, a source of multi-phase alternating electromotive force, and signal controlled rectifying means to impress from said source upon said device a unidirectional voltage which varies in accordance with signals.

11. The method which comprises impressing an alternating voltage upon an asymmetric conductor, varying the conducting properties of said conductor in accordance with signals, and controlling by the resulting rectified current the generation of high frequency oscillations whose frequency is independent of the frequency of the alternating voltage.

12. The method which comprises rectifying a plurality of alternating currents not in phase, combining the rectified currents, variably impeding the currents being rectified so as to vary the amplitude of the combined rectified current in accordance with signals, passing the rectified current through a conductive space, and variably varying, in accordance with the variations of the rectified current, the impedance of the space at a high frequency.

13. The method which comprises impressing an alternating voltage upon an asymmetric conductor, varying the conducting properties of said conductor in accordance with signals, and controlling by the rectified current the generation of other current whose frequency is independent of the frequency of the alternating voltage.

14. In a signaling system, a modulating device, a source of alternating electromotive force and a rectifying device, said devices and said source being included in a series circuit, means for controlling said modulating device by varying the impedance of said rectifying device, and means to prevent the flow of modulated currents through the series circuit.

15. In a signaling system, a wave modifying device for effecting changes in the amplitude of carrier frequency waves in accordance with changes of a unidirectional electromotive force impressed thereon, a plural phase source of alternating electromotive force, rectifiers for supplying unidirectional current from the phases of said source to said device, and means for changing a characteristic of said rectifiers in accordance with signals.

16. In a signaling system, a wave modifying device for effecting changes in the amplitude of carrier frequency waves in accordance with changes in a unidirectional electromotive force impressed thereon, a plural phase source of alternating electromotive force for impressing electromotive force thereon, and a common means operative to convert alternating electromotive force from the phases of said source to continuous unidirectional electromotive force and to vary the magnitude thereof in accordance with signals.

17. A signaling system comprising a thermionic repeater having an input circuit and an output circuit, a space current path for said repeater, means whereby signaling electromotive forces impressed across the space current path cause said repeater to variably repeat to its output circuit waves supplied to its input circuit, a source of multiphase alternating current, and a path for current of each phase produced by said source, each of said paths including said source, said repeater and another repeater individual thereto.

18. In combination, a discharge device for the production of electrical waves, a source of multiphase alternating current in circuit therewith for supplying energy thereto to be converted into waves, a rectifying device connected to the circuit of the current of each of said phases, and means to change a characteristic of said rectifying devices at a signaling frequency rate.

19. In combination, a discharge device for the production of electrical waves, a source of multiphase alternating current in circuit therewith for supplying energy thereto, a space discharge device having an anode, a cathode and an impedance varying element, connected in the circuit of the current of each of said phases, and signaling means operatively associated with said impedance varying elements.

20. A system comprising a plurality of sources of out-of-phase alternating current, means operable to variably impede and rectify the current from said sources, and means variably operable in response to variations in said rectified current to translate the rectified current into high frequency signaling waves whose amplitude varies in accordance with the rectified current variations and whose frequency is independent of the frequency of the alternating current.

21. In a signaling system, a modulating device, a source of multi-phase alternating electromotive force, a system of space discharge tubes operable to rectify and variably impede in accordance with signals the current produced by said source, and means for causing said modulating device to respond to variations in the combined rectified current.

22. A system comprising a space discharge tube having appropriate circuits including intercoupled input and output circuits for the generation of carrier waves, an anode-cathode path in said tube, a source of current supply for said anode-cathode path, another space discharge tube, a series circuit including said source, said anode-cathode path and said other discharge tube, means for varying in accordance with signaling waves the impedance of said other tube to vary in accordance with signals the current supplied to said first mentioned discharge tube, and means in the series circuit to prevent the generated carrier waves from traversing the second tube.

23. In combination an oscillator adapted to produce high frequency oscillations corresponding in amplitude to unidirectional current supplied thereto, a source of alternating current of lower frequency than the oscillations, and a rectifier controlled in accordance with signals, connecting said source to said oscillator.

24. The method of producing oscillations varied in amplitude in accordance with a given wave which comprises rectifying alternating current and at the same time variably controlling the rectification so as to produce unidirectional current varying in amplitude in accordance with said wave and supplying said varying direct current to the space current path of an electron discharge oscillator.

25. In a wave transmission system, a plural phase source of alternating current, separate means for variably impeding in accordance with variations to be transmitted each of the several phases, a common control means for the separate means aforesaid, and means for utilizing the variably impeded current to produce signaling oscillations having a frequency independent of that of the alternating current.

26. A source of signaling waves of relatively low power, separate means controlled by said source for controlling the rectification of several phases of alternating current of considerably greater power, and means for translating the resultant variably rectified current into correspondingly varied signaling oscillations and including means for determining the frequency of the signaling oscillations.

27. A signaling system comprising a plural phase source of alternating current whose phases are less than 180° apart, a space discharge device serially included in each phase source, means including an impedance varying element having input circuits connected thereto for varying the impedance of the discharge devices, and means conjointly controlled by the current of the several phases for producing and transmitting signaling waves and including frequency determining means to render the frequency of the produced signaling waves independent of that of the alternating current.

28. A translating rectifier system which comprises more than one phase of alternating current, a space discharge device individual to each phase for rectifying it, and appropriate circuit arrangements whereby variation in impedance of said space discharge devices translates the rectified current into current fluctuating at a characteristic frequency not dependent upon the frequency of the alternating current.

29. A translating rectifier system which comprises more than one phase of alternating current, a space discharge device individual to the circuit of each phase for rectifying it, and means including appropriate circuit arrangements whereby variation in impedance of said space discharge devices translates the combined current of the phases into current having amplitude variations at a characteristic frequency not dependent upon the frequency of the alternating current.

In witness whereof, I hereunto subscribe my name this 22nd day of November, A. D. 1918.

HAROLD W. NICHOLS.